United States Patent [19]
Lalancette et al.

[11] Patent Number: 5,876,588
[45] Date of Patent: Mar. 2, 1999

[54] PROCESS FOR REMOVING AND RECOVERING COPPER, SILVER AND ZINC FROM SULFIDE ORES

[75] Inventors: Jean-Marc Lalancette; Hugues Ménard; Régina Zamojska, all of Sherbrooke, Canada

[73] Assignee: UG Plus International Inc., Sherbrooke, Canada

[21] Appl. No.: 785,508

[22] Filed: Jan. 17, 1997

[51] Int. Cl.$^6$ ............... C25C 1/00; C25C 1/20; B01D 11/00; C01G 9/00
[52] U.S. Cl. ............ 205/560; 205/568; 205/571; 205/574; 205/583; 205/584; 205/602; 205/604; 205/607; 423/24; 423/27; 423/29; 423/99; 423/109
[58] Field of Search .................... 205/560, 568, 205/571, 574, 583, 584, 602, 604, 607; 423/24, 27, 29, 99, 109

[56] References Cited

U.S. PATENT DOCUMENTS 4,369,061  1/1983  Kerley, Jr. ................................ 75/103

FOREIGN PATENT DOCUMENTS 23428     2/1981  European Pat. Off. .
91/11539  8/1991  WIPO .

Primary Examiner—Kathryn Gorgos
Assistant Examiner—Edna Wong
Attorney, Agent, or Firm—Joseph W. Molasky & Associates

[57] ABSTRACT

Ores containing copper, zinc, silver in the form of sulfides are treated by a solution of sulfurated sulfite ions and ammonium ions in order to remove most of the metals from the sulfide ores. This treatment renders the resulting gold bearing ores much more amenable to cyanide extraction. Dissolved metals are reclaimed by appropriate techniques, such as electrowinning or liquid-liquid extraction, and the solution of sulfurated sulfites and ammonia is recycled for further lixiviation of fresh ores.

12 Claims, No Drawings

PROCESS FOR REMOVING AND RECOVERING COPPER, SILVER AND ZINC FROM SULFIDE ORES

FIELD OF THE INVENTION

The present invention relates to a process for removing and recovering copper, silver and zinc from sulfide ores, more particularly, those bearing gold.

BACKGROUND OF THE INVENTION

The recovery of gold and silver by the standard cyanide extraction method from either fresh ores or tailings from previous mining operations can be rendered uneconomical if the presence of base metals, such as copper or zinc, competes with gold and silver for the combination with the available cyanide. When these base metals are present in significant amounts, the cyanide consumption which will vary from 0.2 to 1.0 Kg per ton of ore for a normal cyanide extraction of gold will be raised to values that may be ten times higher, thus removing all profitability from the exploitation of low grade ores.

The base metals and silver in minerals associated with gold are very often bonded in one form or another to sulfur, arsenic or oxygen derivatives such as sulfides, arsenides, sulfates, sulfites, oxides, hydroxides, carbonates or mixed salts containing metal to sulfur or metal to oxygen bonds. This is particularly true with tailings which have been exposed to weathering over several years, the chemical entities associated with metals being then fairly complex and partly oxidized.

At the present time, it is not a common practice in the gold extraction industry to implement significant efforts in order to remove base metals and silver prior to cyanide extraction of gold. If a low cost method for base metals removal could be developed, such a preliminary step could prove useful by the reduction of cyanide cost of subsequent gold extraction and by the value of the reclaimed base metals and silver.

OBJECTS AND STATEMENT OF THE INVENTION

An object of the present invention is to provide a preliminary treatment to the starting material, either ore or tailings, in order to remove the base metals so as to avoid consumption of cyanide by these base metals.

It is a further object of the present invention to remove silver in some instances, when the silver-to-gold ratio is high on a molar basis, silver then competing adversely with gold for the complexation with the cyanide.

The invention therefore relates to the removal of base metals, such as copper or zinc, and also of silver from mineral species rich in sulfides, arsenides and oxides of said metals.

It is known that neutral water or slightly acidic water will dissolve some impurities, such as copper sulfate for example, from ores. But one readily notes that many of the metal sulfides present, such as copper sulfides or silver sulfides, are highly insoluble and will not be dissolved at all by either acid or basic washings. Since the base metals and silver compete with gold for cyanide ion by mean of their complexation capability, the leaching solvent should call upon coordinating properties similar to cyanides, namely the ability to form soluble complexes with some base metals and silver.

In spite of extremely high insolubility of some sulfides (solubility products: ZnS: $1.2 \times 10^{-23}$; Ag$_2$S: $1.6 \times 10^{-49}$; CuS: $8.5 \times 10^{-45}$), which makes their extraction rather unexpected, it has been found that solutions of the base metals and silver could be obtained rather readily from sulfide ores of said base metals and silver by the use of sulfur derivatives of the sulfite ion, namely thiosulfate ion $S_2O_3^-$, or the polythionates ions $S_2O_6^-$, $S_3O_6^-$, $S_4O_6^-$, $S_5O_6^-$, $S_6O_6^-$, the presence of ammonia improving the extraction. The higher members of the polysulfide derivatives of the sulfite ion are designated as Wackenroder's acids while the first term $S_2O_3^-$ is the thiosulfate ion and the second term, $S_2O_6^-$ is the dithionic acid. Without going into limitative theoretical considerations, it is believed that the unexpected ability of this class of compounds to dissolve highly insoluble sulfides in the presence of ammonia can be related to their capacity for complexation by the availability of the electrons of the sulfur atoms added to the sulfite anion. This phenomenon can be enhanced and facilitated by the presence of another complexing agent in the solution, such as the ammonium cation $NH_4^+$.

In practice, we have found that for the implementation of the invention, the polythiosulfate anion can be bonded to any cation, rendering it soluble and stable. The ammonium can be present as ammonium hydroxide, $NH_4OH$, or as an appropriate salt of ammonium. The pH of the solution can be near neutral, or basic in a range of pH going from 5 to 12.

The polythiosulfate/ammonium solution is contacted with the ore previoulsy ground to a fine particulate size and the contact is maintained for some hours, pending on the characteristics of the slurry of ores under treatment, with a certain amount of stirrings so as to prevent settling.

The recovery of gold from the ore after lixiviation can then be done by standard cyanide extraction with normal cyanide consumption.

The recovery of the dissolved metal after lixiviation can be done first by phase separation by means of filtration, followed by treatment of the liquid phase containing the metals by an appropriate technique. Electrowinning or liquid-liquid extraction turned out to be efficient ways of collecting the dissolved metals while recycling the polythiosulfate reagent for further lixiviation.

DESCRIPTION OF PREFERRED EMBODIMENT

The implementation of the invention calls for the preparation of a solution of sulfurated sulfite and ammonia. This can be done by dissolving sodium thiosulfate in ammonia so as to obtain a solution containing from 0.5 to 5% by weight of $Na_2S_2O_3$ and from 0.5 to 5% $NH_4OH$ by weight. Sulfurated sulfite can be obtained on site by roasting pyrite so as to produce $SO_2$, adsorbing $SO_2$ in sodium hydroxide solution and boiling the resulting sulfite solution with elemental sulfur. By the addition of ammonia to the cooled sulfurated sulfite solution, the reagent for lixiviation is obtained. The reaction of elemental sulfur with sulfite leads to the production of thiosulfate and more heavily sulfurated entities, such as $S_2O_6^-$, $S_3O_6^-$ and higher molecular weight polysulfites.

The lixiviation is done on an ore which has been reduced to particles in the range of 45 microns or finer, pending on the nature of the starting material. A slurry is prepared with a solid content from 10 to 35% of solids and this slurry is kept homogeneous by stirring. After an appropriate contact at near ambient temperature for eight to twelve hours, the slurry is filtered, rinsed with water and the solid cake is then ready for cyanide treatment or discarded if the leaching of metal was the sole purpose of the operation. The filtrate and rinsings are submitted to a treatment for the recovery of dissolved metals. Such a recovery can be done by electrowinning techniques or liquid-liquid extraction as practiced by those familiar with the art. The depleted solution of sulfurated sulfite/ammonia is then recycled for further lixiviation of fresh ores.

EXAMPLE

The following example illustrates the implementation of the invention with Potosi ore.

A sulfide concentrate obtained after the recovery of tin from the tailings of Potosi mines in Bolivia was refractory to gold extraction, 14 Kg/T of sodium cyanide being required to recover the gold value (about 1 g/T) in these tailings. This sulfide concentrate contained about 0.9% of copper as sulfides, 0.5% of zinc and 200 g/T of silver, equally as sulfides.

A 150 g sample of this sulfide concentrate was lixiviated by 500 ml of a solution of sodium thiosulfate (5%) and ammonia (3% $NH_4OH$). The slurry was stirred at room temperature for a period of 8 hours. After filtration and rinsing, the thiosulfate/ammonia solution had extracted 45% of the zinc, 90% of the copper and 94% of the silver present in the starting ore. Cyanide extraction of gold on the leached ore gave a 87% recovery of gold with 1.0 Kg NaCN per ton of leached ore.

We claim:

1. A process for the removal and recovery of metals including copper, silver and zinc from a slurry of finely ground sulfide ores comprising: lixiviating said ores with a solution of sulfurated sulfite ions in the form of sodium or potassium salts of one or more of the following anions: $S_2O_3^-$, $S_2O_6^-$, $S_3O_6^-$, $S_4O_6^-$, $S_5O_6^-$, $S_6O_6^-$ at a concentration of 0.5% to 5.0% by weight in the lixiviating solution and with ammonium ions to form a lixiviate; and filtering said lixiviate to recover said metals in solution.

2. A process as defined in claim 1, wherein the ammonium ions are in the form of ammonium hydroxides in a concentration of 0.5% to 5% by weight in the lixiviating solution.

3. A process as defined in claim 1, further comprising the step of stirring at a temperature of 10° to 30° C. to keep the slurry of ores homogeneous in said lixiviating solution.

4. A process as defined in claim 1, further comprising the step of recycling said lixiviating solution after recovery for lixiviation of fresh ores.

5. A process as defined in claim 1, wherein dissolved metals are recovered by electrowinning.

6. A process as defined in claim 1, wherein dissolved metals are recovered by liquid-liquid extraction.

7. A process for the removal and recovery of metals including copper, silver and zinc from a slurry of finely ground gold-bearing sulfide ores comprising: lixiviating said ores with a solution of sulfurated sulfite ions in the form of sodium or potassium salts of one or more of the following anions: $S_2O_3^-$, $S_2O_6^-$, $S_3O_6^-$, $S_4O_6^-$, $S_5O_6^-$, $S_6O_6^-$ at a concentration of 0.5% to 5.0% by weight in the lixiviating solution and with ammonium ions to form a lixiviate; filtering said lixiviate to reclaim said metals; and treating the lixiviated ores with cyanide to recover gold.

8. A process as defined in claim 7, wherein the ammonium ions are in the form of ammonium hydroxides in a concentration of 0.5% to 5% by weight in the lixiviating solution.

9. A process as defined in claim 7, further comprising the step of stirring at a temperature of 10° to 30° C. to keep the slurry of ores homogeneous in said lixiviating solution.

10. A process as defined in claim 7, further comprising the step of recycling said lixiviating solution after recovery for lixiviation of fresh ores.

11. A process as defined in claim 7, wherein dissolved metals are recovered by electrowinning.

12. A process as defined in claim 7, wherein dissolved metals are recovered by liquid-liquid extracton.

* * * * *